United States Patent
Zaima

(10) Patent No.: US 10,732,554 B2
(45) Date of Patent: Aug. 4, 2020

(54) IMAGE FORMING APPARATUS WITH TONE CORRECTION

(71) Applicant: CANON KABUSHIKI KAISHA, Tokyo (JP)

(72) Inventor: Nobuhiko Zaima, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/407,694

(22) Filed: May 9, 2019

(65) Prior Publication Data

US 2019/0361380 A1    Nov. 28, 2019

(30) Foreign Application Priority Data

May 28, 2018 (JP) ................................ 2018-101137

(51) Int. Cl.
*G03G 15/00* (2006.01)
*G06K 15/02* (2006.01)
*G06K 15/14* (2006.01)

(52) U.S. Cl.
CPC .......... *G03G 15/5025* (2013.01); *G06K 15/14* (2013.01); *G06K 15/1825* (2013.01)

(58) Field of Classification Search
CPC ........... G03G 15/5025; G03G 15/5058; G03G 15/5041
See application file for complete search history.

(56) References Cited

U.S. PATENT DOCUMENTS

| | | | |
|---|---|---|---|
| 6,229,969 B1 | 5/2001 | Ohki | |
| 7,680,425 B2 | 3/2010 | Hama et al. | |
| 8,600,245 B2 | 12/2013 | Miyagi | |
| 8,929,757 B2 | 1/2015 | Shirafuji et al. | |
| 2010/0166443 A1* | 7/2010 | Muto | G03G 15/5041 399/49 |
| 2011/0052232 A1* | 3/2011 | Ohshima | G03G 15/0131 399/49 |
| 2011/0229171 A1* | 9/2011 | Hirai | G03G 15/0131 399/49 |
| 2016/0124367 A1* | 5/2016 | Kaneko | G03G 15/065 399/53 |
| 2018/0129154 A1 | 5/2018 | Tomii et al. | |

* cited by examiner

*Primary Examiner* — Sandra Brase
(74) *Attorney, Agent, or Firm* — Venable LLP

(57) ABSTRACT

An image forming apparatus configured to form an image on a sheet includes an image bearing member configured to rotate in a predetermined direction, and an image forming unit configured to form an image on the image bearing member based on image data converted based on a conversion condition. A controller of the image forming apparatus controls the image forming unit to form a plurality of measurement images different in density along the predetermined direction of the image bearing member, detects the plurality of measurement images, and generates the conversion condition based on detection results of the plurality of measurement images. The controller controls the image forming unit to form the plurality of measurement images in a dispersed manner in terms of positions of the plurality of measurement images on the image bearing member in accordance with periodic unevenness that occurs in the measurement images.

5 Claims, 6 Drawing Sheets

IMAGE FORMING APPARATUS WITH TONE CORRECTION

BACKGROUND OF THE INVENTION

Field of the Invention

The present disclosure relates to an image formation technology using an electrophotographic method.

Description of the Related Art

In an electrophotographic image forming apparatus, an image density of a formed image easily varies due to a usage environment, the number of printed sheets, and other factors. In a color image forming apparatus configured to perform color printing by superimposing images of a plurality of colors on one another, variation in image density of each color causes variation in color balance (color hue), and thus an image quality is reduced. Therefore, the image forming apparatus performs density correction for suppressing the variation in image density.

When performing the density correction, the image forming apparatus forms a toner image (measurement image) for detecting the image density onto an image bearing member, for example, a photosensitive member or an intermediate transfer member. The image forming apparatus detects the image density of the measurement image by an optical sensor, and corrects the density based on the detection result, to thereby stabilize the image quality of the formed image. The density correction is performed through, for example, calibration of an image formation condition. Examples of the image formation condition include an exposure amount, a developing bias, and a γ correction table. The exposure amount refers to an amount of laser light to be radiated to the image bearing member by an exposing device when an image is formed onto the image bearing member. The developing bias refers to a bias voltage to be applied to a developing device when an electrostatic latent image, which is formed by radiating laser light to the image bearing member, is developed. The developing bias is used to adjust an amount of developer used when the electrostatic latent image is developed. The γ correction table represents a relationship of the image density (output density) of the actually formed image with respect to the image density (input density) of image data representing the image to be formed. The output density is adjusted by the calibration of the image formation condition.

In U.S. Pat. No. 6,229,969 B1, there is disclosed an image forming apparatus including a latent image forming unit configured to form, on an image bearing member, an electrostatic latent image corresponding to an image formation pattern generated by an image processing unit in order to improve stability of an image. The image forming apparatus further includes a developing unit configured to develop the formed electrostatic latent image with toner, a development density detecting unit configured to detect a density of the developed image, and a grayscale control unit configured to control a latent image formation condition based on a development density signal detected by the development density detecting unit.

In the image forming apparatus described in U.S. Pat. No. 6,229,969 B1, the grayscale control unit controls the latent image formation condition by changing a look-up table for correcting an input image signal depending on the development density signal detected by the development density detecting unit.

In an image forming apparatus described in U.S. Pat. No. 8,600,245 B2, a pattern of the same images is formed half a cycle after in order to cancel periodic density unevenness due to an influence of, for example, a photosensitive member serving as an image bearing member.

In U.S. Pat. No. 7,680,425 B2, there is disclosed an image forming apparatus configured to execute moving-average processing based on data included in a range to be processed corresponding to a circumferential length.

However, with such related-art calibration as described above, it is sometimes required to suppress an influence of density unevenness. In such a case, when averaging or other such related-art method is used to suppress the influence of the density unevenness, there is a fear that the number of patch images required for the averaging may increase. In addition, when the averaging is performed, γ characteristics or other such characteristic information relating to the density unevenness may be uniformly averaged, which may lead to a fear of losing information on original characteristics.

SUMMARY OF THE INVENTION

An image forming apparatus, which is configured to form an image on a sheet, according to the present disclosure includes a conversion unit configured to convert image data based on a conversion condition; an image bearing member configured to rotate in a predetermined direction; an image forming unit configured to form an image on the image bearing member based on the image data converted by the conversion unit; a sensor configured to detect a measurement image formed on the image bearing member; and a controller configured to control the image forming unit to form a plurality of measurement images different in density along the predetermined direction of the image bearing member, control the sensor to detect the plurality of measurement images on the image bearing member, and generate the conversion condition based on detection results of the plurality of measurement images obtained by the sensor, wherein the controller is configured to control the image forming unit to form the plurality of measurement images in a dispersed manner in terms of positions of the plurality of measurement images on the image bearing member based on periodic unevenness that occurs in the plurality of measurement images formed along the predetermined direction.

Further features of the present invention will become apparent from the following description of exemplary embodiments (with reference to the attached drawings).

DESCRIPTION OF THE EMBODIMENTS

First Embodiment

Embodiments of the present disclosure are described below in detail with reference to the accompanying drawings. In a first embodiment of the present disclosure described below, the present disclosure is applied to an electrophotographic color copying machine including a plurality of drums. However, the present disclosure is not limited thereto, and can be applied to various types of electrophotographic copying machines, printers, monocolor systems, or image forming apparatus using a method other than an electrophotographic method.

System Configuration

Figure 1:
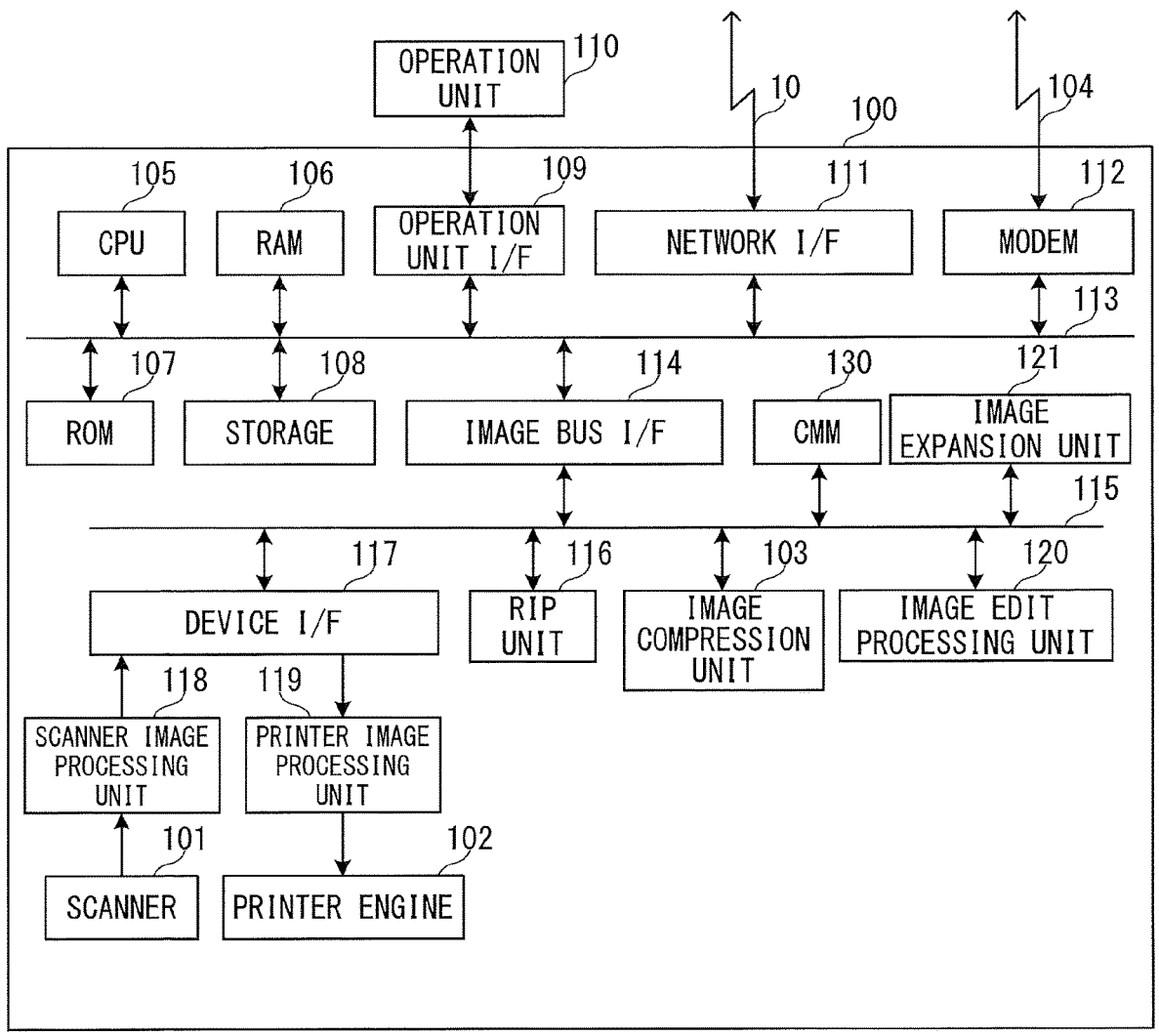
FIG. 1 is a block diagram for illustrating an overall configuration of an image processing system in one embodiment of the present disclosure.

FIG. 1 is a block diagram for illustrating an overall configuration of an image processing system in the first embodiment. In FIG. 1, for example, a scanner 101 serving as an image input device and a printer engine 102 serving as an image output device are internally connected to an image forming apparatus 100.

The scanner 101 is connected to a device I/F 117 via a scanner image processing unit 118. Meanwhile, the printer engine 102 is connected to the device I/F 117 via a printer image processing unit 119. The scanner image processing unit 118 and a printer image processing unit 119 perform control for reading image data and control for outputting a printed matter, respectively. In addition, the image forming apparatus 100 is connected to a local area network (LAN) 10 and a public line 104, and performs control for inputting and outputting image information and device information through the LAN 10 or the public line 104.

The image forming apparatus 100 is connected to an operation unit 110 via an operation unit I/F 109 described later. The operation unit 110 is a user interface including an input button, a numeric keypad, a display, and a touch panel.

The image forming apparatus 100 includes a system bus 113 and an image bus 115. The system bus 113 has a configuration for controlling the entire operation of the image forming apparatus 100. The image bus 115 has a configuration for controlling the operation of the scanner 101 and the operation of the printer engine 102. The system bus 113 and the image bus 115 are connected to each other by an image bus interface (I/F) 114 so as to enable communication therebetween. The image bus I/F 114 is an interface configured to connect between the system bus 113 and the image bus 115 for transmitting the image data at high speed, and is a bus bridge configured to convert data structure.

A central processing unit (CPU) 105, a random access memory (RAM) 106, a read only memory (ROM) 107, and a storage 108 are also connected to the system bus 113. The CPU 105 reads out a computer program from at least one of the ROM 107 or the storage 108, and executes the computer program through use of the RAM 106 serving as a work area, to thereby control the operation of the image forming apparatus 100. The storage 108 is a large-capacity storage device, for example, a hard disk drive or a solid state drive (SSD).

In addition, the above-mentioned operation unit I/F 109, a network I/F 111, and a modem 112 are connected to the system bus 113. The operation unit I/F 109 is an interface for the operation unit 110, which includes a display screen capable of displaying image data and other such information. The image forming apparatus 100 receives a user's instruction from the operation unit 110, and also outputs operation screen data to the operation unit 110, to thereby cause the operation unit 110 to provide the user with the information. The operation unit I/F 109 plays a role of notifying the CPU 105 of the information input by an operator from the operation unit 110. The network I/F 111 is implemented by, for example, a LAN card or other such network interface card (NIC), and is connected to the LAN 10 to receive input of information from an external device (not shown) and output information to the external device. In the same manner, the modem 112 is connected to the public line 104 to receive input of information from an external device (not shown) and output information to the external device.

Meanwhile, a raster image processor (RIP) unit 116, the device I/F 117, the image bus I/F 114, and an image edit processing unit 120 are connected to the image bus 115. In addition, an image compression unit 103, an image expansion unit 121, and a color management module (CMM) 130 are connected to the image bus 115. The RIP unit 116 develops a page description language (PDL) code into image data. The PDL code can also be received from the external device by the network I/F 111. The device I/F 117 is connected to the scanner 101 and the printer engine 102 via the scanner image processing unit 118 and the printer image processing unit 119, respectively, to convert the image data in a synchronous manner or an asynchronous manner.

Further, the scanner image processing unit 118 is configured to subject the image data input from the scanner 101 to various types of processing such as correction and editing. The image editing processing unit 120 is configured to perform various types of image processing such as rotation, color processing, binary conversion, and multi-value conversion of the image data. The image compression unit 103 is configured to encode the image data processed by the RIP unit 116, the scanner image processing unit 118, and the image editing processing unit 120 through use of a predetermined compression system when once storing the encoded image data into the storage 108.

When the image data compressed in the storage 108 is output from the printer engine 102 after being subjected to processing by the image edit processing unit 120 and image processing by the printer image processing unit 119 as the requirement arises, the image expansion unit 121 decodes and expands the compressed and encoded data. The printer image processing unit 119 subjects the image data to be output as a print to image formation condition correction and image processing correction depending on a printer engine, such as γ correction and halftone processing.

The CMM 130 is a dedicated hardware module configured to subject the image data to color conversion processing (also referred to as "color space conversion processing") based on a profile and calibration data. In this case, the profile refers to a function or other such information for converting color image data expressed by a color space dependent on the apparatus into a color space (for example, Lab color space) independent of the apparatus. The calibration data is data for correcting the color reproducibility of the scanner 101 or the printer engine 102.

Software Configuration

Figure 2:
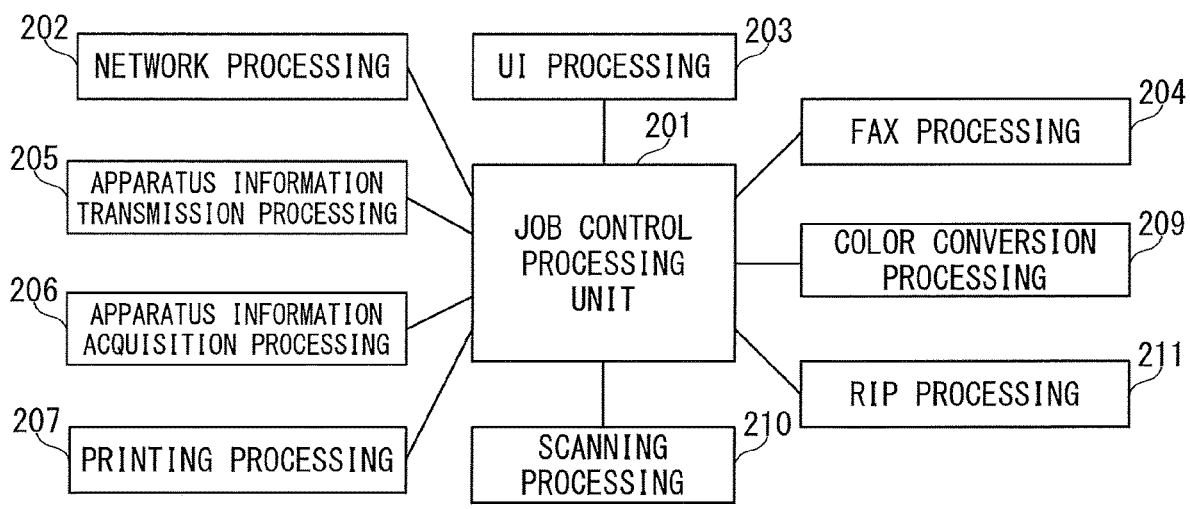
FIG. 2 is a block diagram for illustrating software modules.

FIG. 2 is an explanatory diagram of software modules of the image forming apparatus 100. The software modules are implemented by the CPU 105 executing the computer program. In the first embodiment, the respective software modules illustrated in FIG. 2 are stored in, for example, the storage 108 serving as a storage unit, and operate mainly on the CPU 105. Job control processing 201 illustrated in FIG. 2 centrally controls the respective software modules (shown or not shown) to control jobs of, for example, copying, printing, scanning, and facsimile (FAX) transmission and reception, which occur in the image forming apparatus 100.

The software modules to be controlled are, for example, network processing 202, user interface (UI) processing 203, FAX processing 204, apparatus information transmission processing 205, apparatus information acquisition processing 206, printing processing 207, color conversion processing 209, scanning processing 210, and RIP processing 211.

The network processing 202 is a software module configured to mainly control communication to/from an external device via the network I/F 111, and controls the communication to/from the respective apparatus on the LAN 10.

The UI processing 203 is a software module configured to mainly control communication to/from the operation unit 110 via the operation unit I/F 109. The FAX processing 204 is a software module configured to perform facsimile communication via the modem 112.

The apparatus information transmission processing 205 is a software module configured to transmit apparatus information to a predetermined external device by the network processing 202 based on the instruction from the job control processing 201. The apparatus information includes information representing the abilities and the characteristics of the image forming apparatus 100, such as the type (color/monochrome) of the printer engine 102, the resolution of the printer engine 102, the printing speed of the printer engine 102, the processing time of the color conversion processing 209, and the output profile. The apparatus information acquisition processing 206 is a software module configured to transmit an apparatus information acquisition request to a predetermined external apparatus by the network processing 202 based on the instruction from the job control processing 201.

The printing processing 207 controls the image edit processing unit 120, the printer image processing unit 119, and the printer engine 102 based on the instruction from the job control processing 201 to perform processing for printing a designated image. The printing processing 207 receives, from the job control processing 201, information included in image data, image information (for example, image data size, color mode, and resolution), layout information (for example, offset, scaling, and imposition), and sheet information (for example, size and printing direction). Then, the printing processing 207 controls the image compression unit 103, the image expansion unit 121, the image edit processing unit 120, and the printer image processing unit 119 to subject the image data to appropriate image processing. Then, the printing processing 207 controls the printer engine 102 to subject the image data to perform printing on a sheet.

The color conversion processing 209 subjects the designated image to color conversion processing based on the instruction from the job control processing 201, and notifies the job control processing 201 of an image subjected to the color conversion processing. The scanning processing 210 controls the scanner 101 and the scanner image processing unit 118 based on the instruction from the job control processing 201 to read an original on the scanner 101.

The scanning processing 210 executes the scanning of an original on an original table of the scanner 101 to input an image of the original as digital data. The scanning processing 210 then notifies the job control processing 201 of color information on the input image. The scanning processing 210 further controls the scanner image processing unit 118 to subject the input image to image compression or other such appropriate image processing, and then notifies the job control processing 201 of the input image subjected to the image processing.

The RIP processing 211 performs PDL interpretation of (interprets) the image data based on the instruction from the job control processing 201, and controls the RIP unit 116 to perform rendering, to thereby develop the image data to a bitmap image.

Flow of Image Data Processing

With the above-mentioned configuration, the image forming apparatus 100 receives a print job from the operation unit 110, or from the external device through the LAN 10, to form an image that is based on the image data onto a recording medium. When an image is to be formed, the printer image processing unit 119 subjects the image data to various types of processing. Next, a description is given of a flow of processing performed on the image data input to the printer image processing unit 119 based on the above-mentioned configuration.

As described above, the PDL code transmitted from the external device via the LAN 10 is received by the network I/F 111 to be input from the image bus I/F 114 to the RIP unit 116. The RIP unit 116 interprets the received PDL code to convert the PDL code into code data processable by the RIP unit 116. Then, the RIP unit 116 executes rendering of the image data based on the code data obtained by conversion. Page data (image data on each page) subjected to the rendering by the RIP unit 116 is compressed by the image compression unit 103 in the subsequent stage, and is sequentially stored in the storage 108.

Subsequently, the compressed data stored in the storage 108 is read out in a printing operation performed in accordance with the instruction from the job control processing 201, and expansion processing is performed on the compressed data by the image expansion unit 121. The image data expanded by the image expansion unit 121 is input to the printer image processing unit 119 via the device I/F 117.

Figure 3:
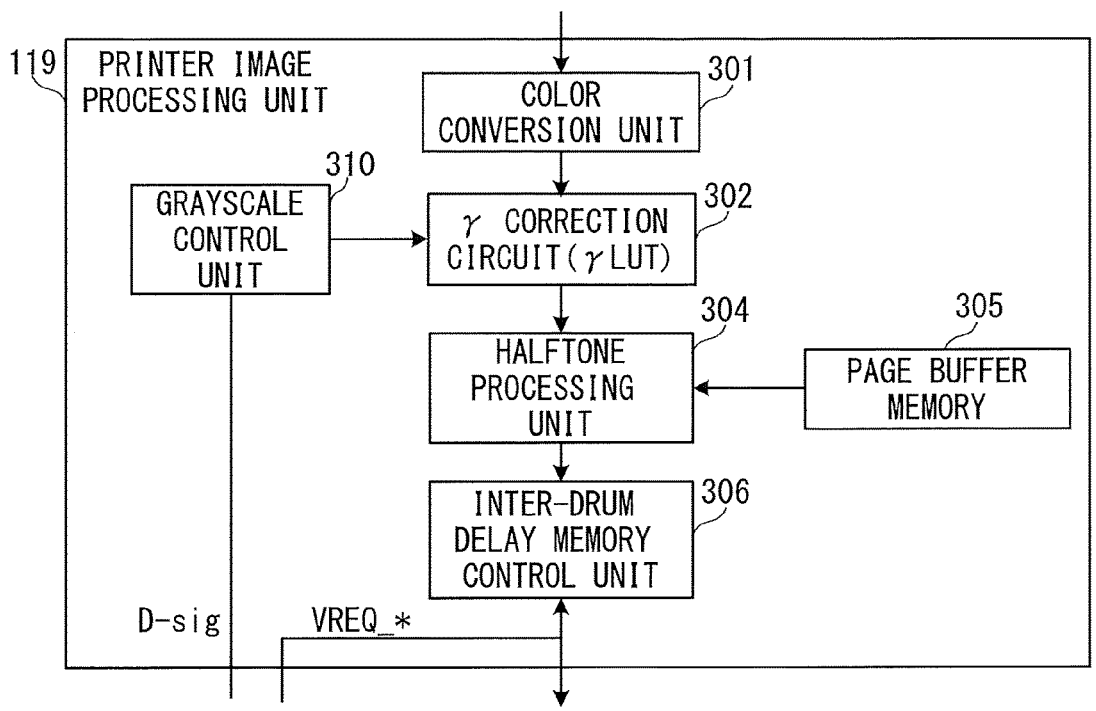
FIG. 3 is a functional block diagram of a printer image processing unit.

FIG. 3 is a functional block diagram of the printer image processing unit 119. The printer image processing unit 119 functions as a color conversion unit 301, a γ correction circuit 302, a halftone processing unit 304, a page buffer memory 305, an inter-drum delay memory control unit 306, and a grayscale control unit 310. The color conversion unit 301 is configured to convert the image data from a brightness value (for example, RGB value or YUV value) into a density value (for example, CMYK value), and convert the input image data into a color space corresponding to color components that can be printed by the printer engine 102 in the subsequent stage. The multivalued image data obtained by the conversion has a density signal converted by the γ correction circuit 302 into a signal value for reproducing its density by the printer engine. The γ correction circuit 302 generates a γ look-up table (γLUT), which is a table to be referred to in order to perform grayscale correction in grayscale control described later, as correction data for correcting a change in density.

The grayscale control unit 310 performs processing relating to the grayscale control described later. The grayscale control unit 310 determines an image pattern to be used for the grayscale control suitable for periodic unevenness, and inputs its image data to the halftone processing unit 304 through use of the γLUT. In this case, the γLUT is set as a linear table in which an input level and an output level are equal to each other, and γ characteristics of the printer can be detected from the input data. A detection result (D-sig) of the image pattern is received from a photosensor 1230 described later via a printer I/F unit 1201, and the γLUT is created based on the result by a method described later, and is set in the γ correction circuit 302.

The halftone processing unit 304 subjects the image data corrected by the γ correction circuit 302 to halftone processing to convert the image data into image data in which each color component of one pixel is represented by a binary value (1 bit). Examples of the halftone processing generally include dithering and error diffusion, and any of the methods may be employed. The halftone processing is not limited to the above-mentioned methods, and another method may be used.

The binary image data generated in the conversion processing by the halftone processing unit 304 is divided for each color component of each pixel in the image data via the inter-drum delay memory control unit 306, and temporarily stored in the page buffer memory 305. At a timing at which a video data request signal corresponding to each color component transmitted from the printer engine 102 is input, the data of the corresponding color component is read out.

The video data request signals are set as VREQ_Y, VREQ_M, VREQ_C, and VREQ_K with respect to the respective color components. Timings to expose photosensitive drums 1401 to 1404, which serve as photosensitive members corresponding to the respective color components in the printer engine 102, differ depending on a distance from an upstream side to a downstream side of a line in which the respective photosensitive drums 1401 to 1404 are arranged. Therefore, the timing to read out the data of each color component also differs. The photosensitive member is exemplified by the photosensitive drum, but a photosensitive belt may be provided as the photosensitive member.

Printer Engine Operation

Next, a description is given of an operation performed when the color component data output by the printer image processing unit 119 is input to the printer engine 102.

Figure 4:
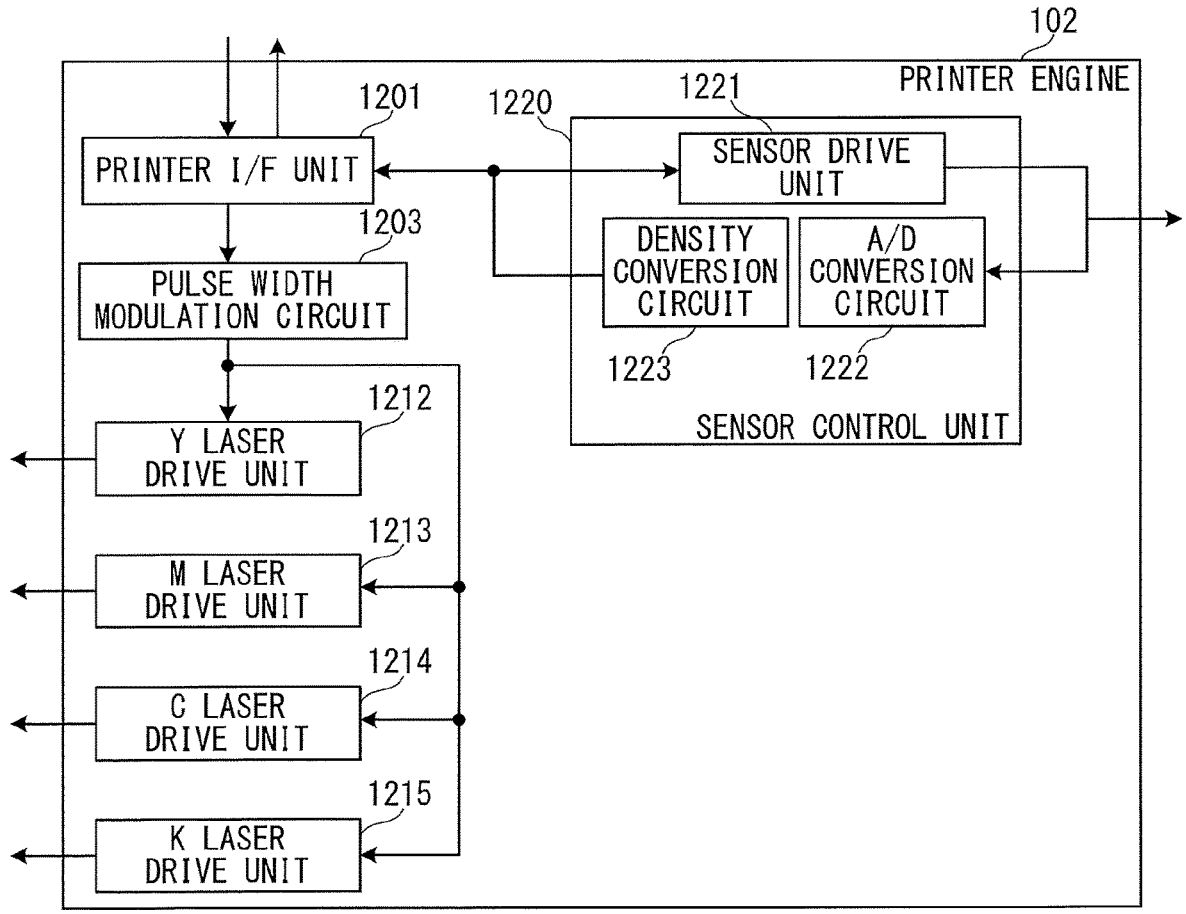
FIG. 4 is a hardware configuration diagram of a printer engine.

FIG. 4 is a hardware configuration diagram of the printer engine 102. The printer engine 102 includes a printer I/F 1201, a pulse width modulation circuit 1203, a yellow (Y) laser drive unit 1212, a magenta (M) laser drive unit 1213, a cyan (C) laser drive unit 1214, and a black (K) laser drive unit 1215.

The printer I/F unit 1201 is an interface between the printer engine 102 and the printer image processing unit 119, and receives the color component data that is sequentially transmitted from the printer image processing unit 119. When the printer engine 102 becomes ready to perform the printing operation, the printer I/F unit 1201 issues VREQ_* ("*" represents any one of Y, M, C, and K), which is the video data request signal for requesting the data of each color component.

The color component data is input to the pulse width modulation circuit 1203. The pulse width modulation circuit 1203 generates pulse signals (drive signals) for driving the laser drive units 1212 to 1215 of the respective colors in the subsequent stage based on the actual color component data. The Y laser drive unit 1212, the M laser drive unit 1213, the C laser drive unit 1214, and the K laser drive unit 1215 acquire the drive signals from the pulse width modulation circuit 1203 to drive laser exposure devices corresponding to the respective color components based on the pulse widths of the drive signals.

The sensor control unit 1220 detects the image pattern output by the grayscale control unit 310 by a sensor drive unit 1221. Then, the detection value is set as the density value (D-sig) by an A/D conversion circuit 1222 and a density conversion circuit 1223, and transmitted to the grayscale control unit 310 as the detection result via the printer I/F unit 1201.

Figure 5:
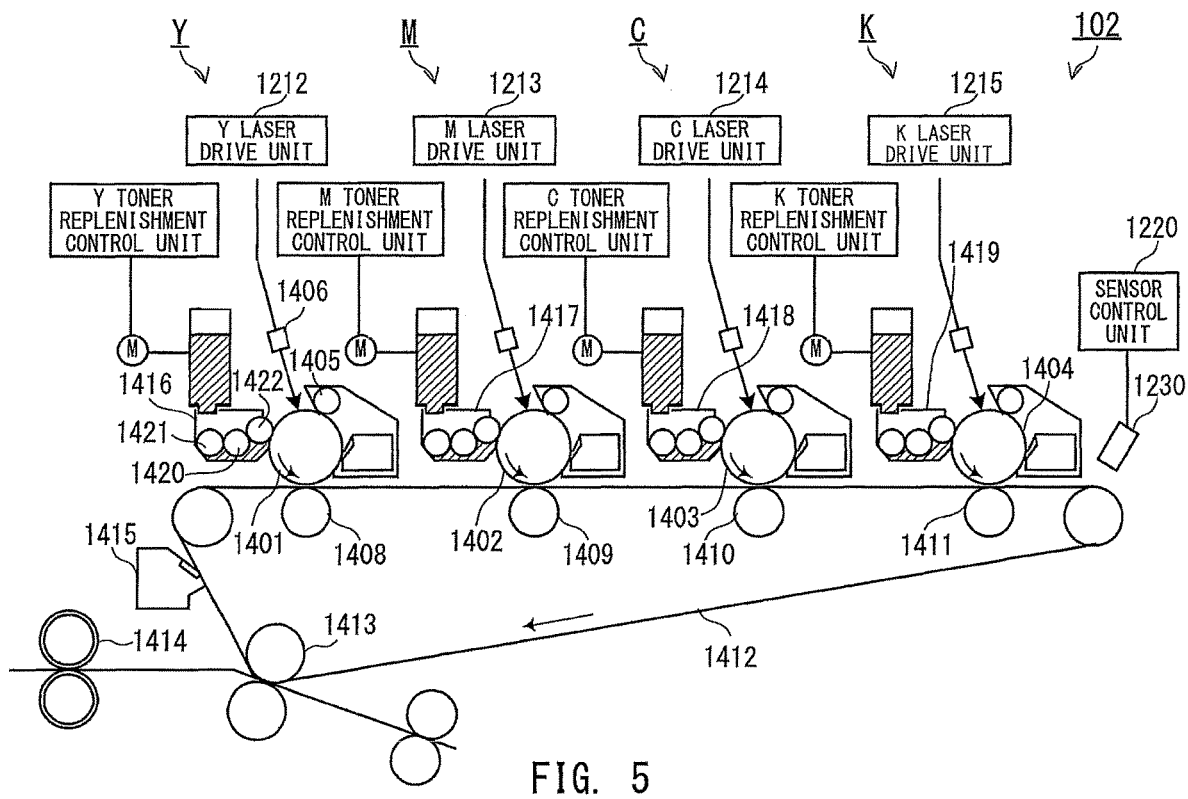
FIG. 5 is a cross-sectional view of an image forming part of the printer engine.

FIG. 5 is a configuration diagram of an image forming part of the printer engine 102. The printer engine 102 is of a tandem engine type including a plurality of image forming portions. The printer engine 102 in the first embodiment includes a yellow (Y) image forming portion Y, a magenta (M) image forming portion M, a cyan (C) image forming portion C, and a black (K) image forming portion K. The printer engine 102 includes, in addition to the image forming portions Y, M, C, and K of the respective colors, primary transfer units 1408, 1409, 1410, and 1411, a transfer material 1412 serving as an intermediate transfer member being an image bearing member, a secondary transfer unit 1413, a fixing device 1414, and a cleaning device 1415.

The following description is mainly directed to the image forming part of yellow, but the image forming parts of the other color components of magenta, cyan, and black have the same configuration.

The printer engine 102 includes the photosensitive drum 1401 serving as an image bearing member, a charge roller 1405, a Y laser exposure device 1406, the primary transfer unit 1408, the secondary transfer unit 1413, the fixing device 1414, and the cleaning device 1415. The Y laser exposure device 1406 is driven by the Y laser drive unit 1212. The primary transfer unit 1408 primarily transfers a visualized toner image onto an endless intermediate transfer member or onto the transfer material 1412 serving as an intermediate transfer belt. The transfer material 1412 is wound around to pass through the secondary transfer unit 1413 and between the photosensitive drums 1401, 1402, 1403, and 1404 and the primary transfer units 1408, 1409, 1410, and 1411, respectively, and rotates clockwise in FIG. 5. The secondary transfer unit 1413 secondarily transfers the toner image formed on the transfer material 1412 onto the sheet. The fixing device 1414 fixes the toner image transferred onto the sheet. The cleaning device 1415 removes transfer residual toner remaining on the transfer material 1412 after the secondary transfer.

A developing device 1416 includes a developer container, and accommodates, as two-component developer, developer in which toner particles (toner) and magnetic carrier particles (carrier) are mixed. A screw A 1420 and a screw B 1421 carry the toner particles and mix the magnetic carrier particles with those toner particles, respectively. A developing sleeve 1422 is arranged close to the photosensitive drum 1401, and is rotated in accordance with the photosensitive drum 1401 to carry the developer in which the toner and the carrier are mixed. The developer carried by the developing sleeve 1422 is brought into contact with the photosensitive drum 1401, and thus the electrostatic latent image formed on the photosensitive drum 1401 is developed.

When the printing is performed in yellow by the above-mentioned configuration of the printer engine, the photosensitive drum 1401 is exposed by the Y laser exposure device 1406 driven by the Y laser drive unit 1212, and an electrostatic latent image is formed on the photosensitive drum 1401. The formed electrostatic latent image is visualized as a toner image by yellow developer carried on the developing sleeve 1422 in the developing device 1416, and the visualized toner image is transferred onto the transfer material 1412 by the primary transfer unit 1408.

In the same manner, the respective color components of magenta, cyan, and black are developed by developing devices 1417, 1418, and 1419, respectively, and visualized as toner images by the photosensitive drums 1402, 1403, and 1404, respectively. Then, the visualized toner images are sequentially transferred by the respective primary transfer units 1409, 1410, and 1411 in synchronization with the toner image of the color component transferred immediately before, and a final toner image formed of the toner images of the four colors is formed on the transfer material 1412.

The toner image formed on the transfer material 1412 is secondarily transferred onto the sheet serving as a material to be subjected to transfer, which is being conveyed in synchronization with the toner image, between the secondary transfer unit 1413 and an opposing roller, and has the toner image fixed by the fixing device 1414. Then, the sheet is delivered by the printer engine 102, and the printing operation is ended.

Between a primary transfer position and a secondary transfer position, the photosensor 1230 formed of an LED and a photodiode is provided so as to be opposed to the transfer material 1412 in order to detect an amount of light reflected by a patch pattern formed of measurement images formed on the transfer material 1412. Near-infrared light radiated from the transfer material 1412 to enter the photosensor is converted into an electrical signal by the photosensor 1230. The electrical signal obtained by the conversion is converted into a digital signal in which output voltages of from 0 V to 5 V correspond to 0 to 1,023 levels by the A/D conversion circuit 1222, and converted into a density by the density conversion circuit 1223.

Grayscale Control

Next, a description is given of the grayscale control performed by the image forming apparatus 100 in the first embodiment.

The grayscale control is performed in order to stably reproduce the output density and grayscale of the image forming apparatus 100. To that end, the image forming apparatus 100 detects the patch pattern formed on the transfer material to detect γ characteristics of the printer engine, and creates the above-mentioned γLUT in order to convert the image data in accordance with the detected γ characteristics.

In the first embodiment, while an influence of periodic unevenness in a conveyance direction of the sheet is eliminated, an increase in number of patch images being the measurement images and a loss of information are prevented, and a patch pattern for grayscale control that can ensure a given number of gradation levels is formed. In the image forming apparatus 100, periodic density unevenness is liable to occur in a rotation direction of rotating members depending on states of the photosensitive drum, the charge roller, the developing sleeve, the transfer belt, and other such rotating members due to their influences. When the density unevenness has occurred in a patch pattern formed along the rotation direction of the rotating members, detection accuracy of γ characteristics obtained based on measurement results of the patch pattern is lowered.

A description is given of the density unevenness ascribable to the photosensitive drums 1401 to 1404 in the first embodiment. The following description is applied to any one the photosensitive drums 1401 to 1404 in the same manner, and hence the photosensitive drums 1401 to 1404 are referred to simply as "photosensitive drum" for the sake of simplicity of the description. In the same manner, the reference symbols of the other components included in the image forming apparatus 100 are also omitted unless particularly required.

The photosensitive drum has a diameter φ of 38.2 mm and a circumferential length of 120 mm. One cycle of the density unevenness corresponds to one turn of the photosensitive drum, and a length of the one turn being 120 mm is represented by L. A plurality of patches serving as the measurement images are formed and arranged along the conveyance direction of the original, to thereby form a patch pattern. When a number of patches formed in one cycle of the photosensitive drum is represented by Ps and a length of each individual patch is represented by Pl, Pl=L/Ps is established. In the first embodiment, six patches are formed over the length L=120 mm of one turn of the photosensitive drum, and hence the number Ps=6 of patches and the length Pl=20 mm of each individual patch are obtained.

Figure 6:
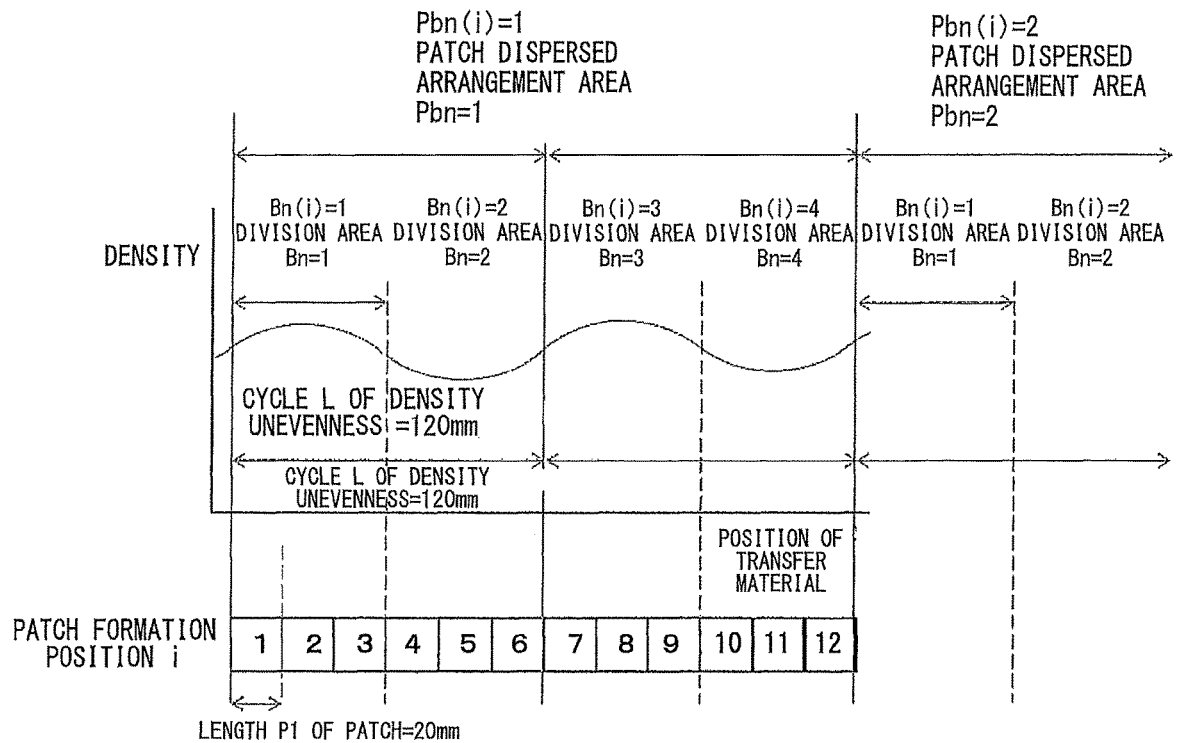
FIG. 6 is an explanatory diagram of, for example, patch dispersed arrangement areas.

FIG. 6 is an explanatory diagram for showing a relationship among the length L of one turn of the photosensitive drum, formed patches, the lengths of the patches, and other such data. In FIG. 6, a patch Vn(1), a patch Vn(2), a patch Vn(3), . . . a patch Vn(12) are formed in a line along the conveyance direction of the original at positions at each of which a formation position (position in formation order) i of a patch is written.

As illustrated in FIG. 6, patch formation positions 1 to 6 correspond to the first revolution of the photosensitive drum, and patch formation positions 7 to 12 correspond to the second revolution of the photosensitive drum. The patches Vn(1) to Vn(12) are a pattern of a set of patches having 12 gradations of one color. In the example of FIG. 6, the color of the patches Vn(1) to Vn(12) is black, and the patch density is set to increase as the number increases.

Hitherto, the patches Vn(1) to Vn(12) are sequentially arranged at the patch formation positions 1 to 12 in numerical order, and the patch Vn(1), the patch Vn(2), the patch Vn(3), . . . the patch Vn(12) are sequentially read as the photosensitive drum rotates. Therefore, the patch number Vn(i) has the same value as the value of the patch formation position i. In regard to the patches Vn(1) to Vn(12), their target densities are compared with the density values obtained from the actual measurement results of the patches, to thereby obtain correction values for the detected density values.

Meanwhile, as described later, in the first embodiment, the patches Vn(1) to Vn(12) are not arranged in numerical order (that is, in order of density). Instead, one cycle of the photosensitive drum is divided into a plurality of areas, and the patches Vn(1) to Vn(12) are assigned to the respective areas to be arranged in a dispersed manner. For example, one cycle of the photosensitive drum is divided into two areas. Meanwhile, a first patch image sequence (first image sequence) and a second patch image sequence (second image sequence) following the first patch image sequence are formed on the transfer material. The first patch image sequence corresponds to a first dispersed arrangement area (Pbn) formed of division areas bn1 to bn4, and the second patch image sequence corresponds to a second dispersed arrangement area (Pbn) formed of the subsequent division areas bn1 to bn4. In this case, the patches Vn(1) to Vn(12) are assigned in each of the first patch image sequence and the second patch image sequence so as to be arranged in a dispersed manner without being arranged in order of density.

The patches Vn(1) to Vn(6) correspond to the first turn of the photosensitive drum, and the patches Vn(7) to Vn(12) correspond to the second turn of the photosensitive drum.

Therefore, the patches Vn(1) to Vn(6) in the first patch image sequence are generated for the first turn of the photosensitive drum. In the same manner, the patches Vn(7) to Vn(12) in the first patch image sequence are generated for the second turn of the photosensitive drum.

A specific example of dividing one turn of the photosensitive drum into two areas is described below in detail. In the first embodiment, patches 1 to 12 are arranged in a dispersed manner in the order indicated by Expression 1 and Table 1 described later. Therefore, six patches are arranged in correspondence with the one cycle of the photosensitive drum, and a pattern of a set of patches is formed for two turns of the photosensitive drum. An area in which a pattern of a set of patches is formed is set as a patch dispersed arrangement area, and the number of a patch dispersed arrangement area is represented by Pbn(i). An area obtained by dividing the photosensitive drum is set as a division area, and the number of the division area in the patch dispersed arrangement area Pbn(i) is represented by Bn(i).

In the first embodiment, 12 patches are included in a pattern of a set of patches (in this case, 12 gradations of one color), while six patches are arranged in one patch dispersed arrangement area corresponding to the one cycle of the photosensitive drum.

As illustrated in FIG. 6, the area in which the patches Vn(1) to Vn(6) corresponding to the first revolution of the photosensitive drum are arranged is formed of division areas Bn(i)=1 and 2. In the same manner, the area in which the patches Vn(7) to Vn(12) corresponding to the second revolution of the photosensitive drum are arranged is formed of division areas Bn(i)=3 and 4.

In addition, in the first embodiment, one cycle of the density unevenness is divided into a plurality of areas, and the number of division areas is represented by S. In FIG. 6, an example in which the number S of division areas is 2 is illustrated, and the respective two areas obtained by the division are represented by the division areas Bn(i)=1 and 2. The number of division areas can be freely defined.

From the above-mentioned setting, the number Ps of patches that can be formed in one cycle of the density unevenness is L/Pl, and a number Bs of patches that can be formed in one division area can be obtained by dividing the number Ps of patches formed in one cycle of the photosensitive drum by S. Therefore, Bs=Ps/S is established. All patch dispersed arrangement calculations involve discarding digits after a decimal point. In the following expressions, Gauss's notation [x] is used to indicate that digits after the decimal point of a given number x are to be discarded.

The meanings of Ps for one turn of the photosensitive drum and other such symbols and the values of Ps and the other symbols in the first embodiment are summarized below.

Figure 7A:
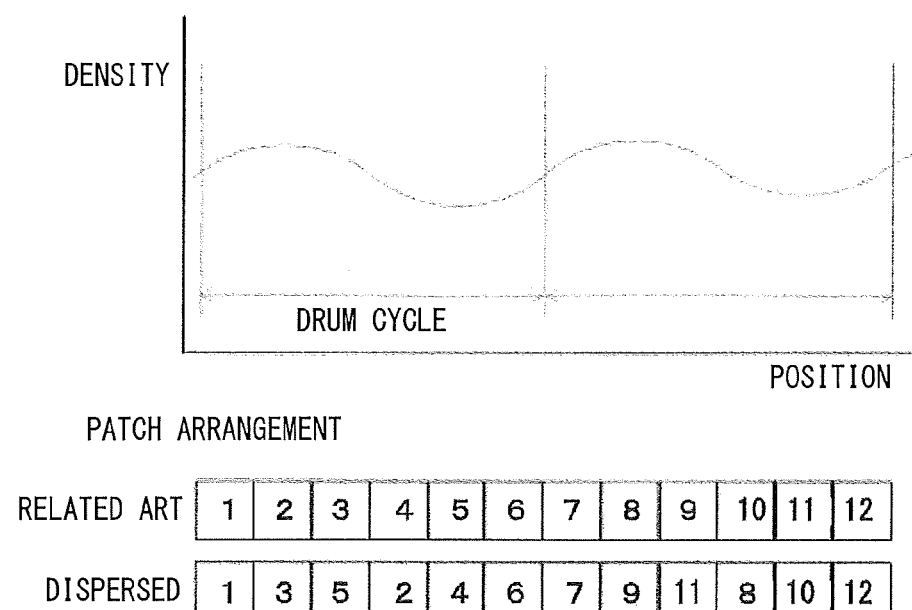
FIG. 7A is an explanatory diagram of how the density unevenness is exhibited.
Figure 7B:
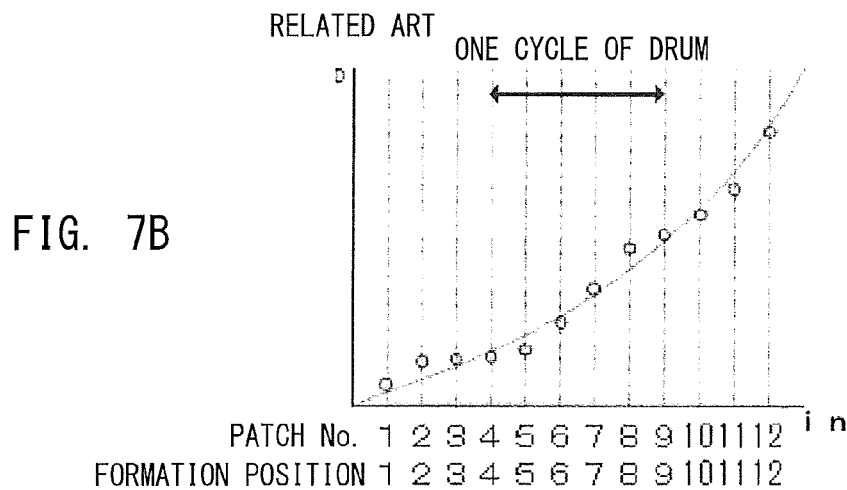
FIG. 7B is an explanatory graph for showing a relationship between a patch density and a density detection value.
Figure 7C:
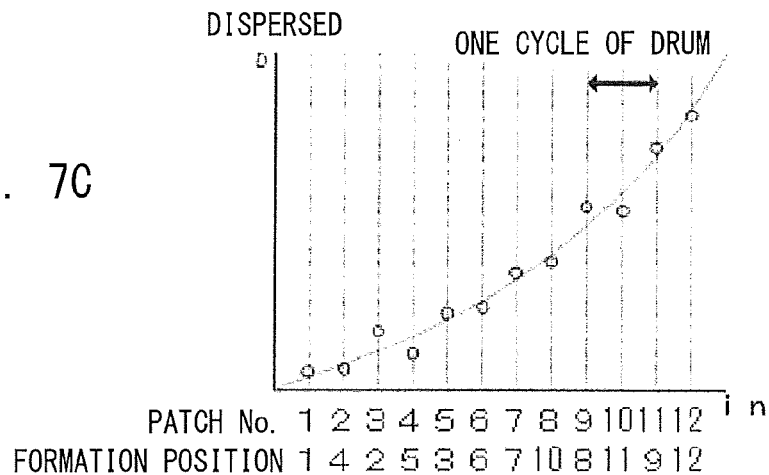
FIG. 7C an explanatory graph for showing a relationship between the patch density exhibited when a dispersion arrangement is performed and the density detection value.

L: Circumferential length (120 mm) of a photosensitive drum, namely, length of unevenness
Ps: Number (6) of patches
Pl: Length (20 mm) of each individual patch
Pb: Number of cycles of unevenness used in one patch dispersed arrangement area
Pn: The number of gradation levels of a pattern of a set of patches
B: Number of division areas used for a pattern of a set of patches
S: Number (2) of division areas
Bs: Number (3) of patches formed in one division area
Bn(i): Division area number
Pbn(i): Patch dispersed arrangement area number FIG. 7A is an explanatory diagram of how the density unevenness is exhibited with respect to the rotation of the photosensitive drum, FIG. 7B is an explanatory graph for showing a relationship between a patch density and the density detection value, and FIG. 7C is an explanatory graph for showing a relationship between the patch density exhibited when a dispersion arrangement is performed and the density detection value. In the density unevenness due to the photosensitive drum or other such rotating member, a change in density is repeated in a cycle of one revolution of the rotating member. Therefore, in one embodiment of the present disclosure, the patch pattern is arranged in a different order as shown below in Table 1. The patch numbers are represented by the patches 1, 2, 3, 4 . . . 12 in ascending order of density, the arrangement positions of the patches are represented by i (1, 2, 3, 4 . . . 12), and the patch numbers of patches to be arranged at the respective patch formation positions i are represented by Vn(1), Vn(2), Vn(3), . . . Vn(i).

The patch number of the patch to be arranged at each patch formation position i can be obtained through use of Expression 1.

$$Vn(i)=1+(P1+(Bn(i)-1)+(Bi(i)-1)*Pn/(Pn/B)+Pb*Ps*(Pbn(i)-1) \quad \text{(Expression 1)}$$

Bn(i) represents the number of the division area in the patch dispersed arrangement area Pbn(i) corresponding to the patch formation position i.

Bi(i) represents a position in the division area Bn(i) corresponding to the patch formation position i. The patch formation positions i=1, 2, and 3 are the first, second, and third positions in the corresponding division area Bn(i)=1, respectively. Therefore, Bi(i)=1, 2, and 3 is established for the patch formation positions i=1, 2, and 3, respectively.

The patch formation positions i=4, 5, and 6 are the first, second, and third positions in the corresponding division area Bn(i)=2, respectively. Therefore, Bi(i)=1, 2, and 3 is established for the patch formation positions i=4, 5, 6, respectively. In the same manner, Bi(i)=1, 2, and 3 is established for the patches 7, 8, and 9, respectively, and Bi(i)=1, 2, and 3 is established for the patches 10, 11, and 12, respectively.

In mathematical expressions, Pbn(i), Bn(i), and Bi(i) are expressed by Expressions 2, 3, and 4, respectively.

$$Pbn(i)=1+[(i-1)/(Pb*Ps)] \quad \text{(Expression 2)}$$

$$Bn(i)=1+[(i-1)/Bs]-S*Pb*(Pbn-1) \quad \text{(Expression 3)}$$

$$Bi(i)=i-[Pb*Ps*(Pbn-1)]-[Bs*(Bn-1)] \quad \text{(Expression 4)}$$

A relationship between the density unevenness exhibited in this case and respective parameters is illustrated in FIG. 6. When Vn(i) is obtained based on this, the patch numbers corresponding to the patch formation positions i=1 to 12 are 1, 3, 5, 2, 4, 6, 7, 9, 11, 8, 10, and 12, respectively. The results are shown in Table 1.

TABLE 1

| i      | 1 | 2 | 3 | 4 | 5 | 6 | 7 | 8 | 9  | 10 | 11 | 12 |
|--------|---|---|---|---|---|---|---|---|----|----|----|----|
| Pbn(i) | 1 | 1 | 1 | 1 | 1 | 1 | 2 | 2 | 2  | 2  | 2  | 2  |
| Bn(i)  | 1 | 1 | 1 | 2 | 2 | 2 | 1 | 1 | 1  | 2  | 2  | 2  |
| Bi(i)  | 1 | 2 | 3 | 1 | 2 | 3 | 1 | 2 | 3  | 1  | 2  | 3  |
| Vn(i)  | 1 | 3 | 5 | 2 | 4 | 6 | 7 | 9 | 11 | 8  | 10 | 12 |

In this manner, the patch numbers of the patches to be arranged at the respective patch formation positions 1 to 12 in the first embodiment are obtained.

In FIG. 7A, FIG. 7B, and FIG. 7C, a difference between the case of performing the patch dispersed arrangement in the first embodiment and the related-art case of arranging patches in order of level is shown.

FIG. 7A is an illustration of the periodic density unevenness of the photosensitive drum in a transition of the change in density exhibited when an image is formed in the conveyance direction at a uniform level. In the photosensitive drum having such characteristics in density transition, the patches were arranged in ascending order of density as in the related-art manner, and measured values were obtained from the respective patches to obtain the measurement data. Those patch densities serving as a comparative example are shown in FIG. 7B. In this example, the patches are arranged as the patches 1, 2, 3, 4, . . . 12 in ascending order of density. In FIG. 7B, the solid line indicates an original density of each patch measured when there is no density unevenness of the photosensitive drum, and the white circles indicate the actually measured values.

When there is no density unevenness of the photosensitive drum, the actually measured values of the respective patches 1 to 12 are supposed to match the solid line. However, in an actual case, the density unevenness periodically occurs in the photosensitive drum as illustrated in FIG. 7A, and hence the actually measured value fails to match the solid line. For example, in FIG. 7B, the actually measured values of the patches 1 and 3 are values slightly higher than the original densities indicated by the solid line, and the actually measured value of the patch 2 is a considerably high value. Meanwhile, the actually measured values of the patches 4 and 6 are values slightly lower than the original densities indicated by the solid line, and the actually measured value of the patch 2 is a considerably low value. Therefore, in the comparative example, the actually measured values shown in FIG. 7B, in which the density unevenness of the photosensitive drum is reflected, become γ characteristics.

Meanwhile, in the first embodiment, the densities are measured by arranging, as shown in Table 1, the patches 1, 3, 5, 2, 4, 6, 7, 9, 11, 8, 10, and 12 at the patch formation positions 1 to 12, respectively, in a dispersed manner. After the densities were measured based on such a dispersed arrangement, in the same manner as in FIG. 7B, the patches were rearranged as the patches 1, 2, 3, 4, . . . 12 in ascending order of density to obtain the measurement data. The measurement results are shown in FIG. 7C.

In FIG. 7C, the patch 1 is measured by being arranged at the first position in the same manner as in FIG. 7B. Therefore, in FIG. 7B and FIG. 7C, the actually measured value of the patch 1 is the same. However, the patch 2 in the first embodiment is arranged at the patch formation position i=4 as shown in Table 1, and is therefore measured by being arranged at the position of the patch 4 in FIG. 7B. Therefore, the measured density value of the patch 2 in FIG. 7C is slightly low in the same manner as the patch 4 in FIG. 7B.

The patch 3 is arranged at the patch formation position i=2 as shown in Table 1, and is therefore measured by being arranged at the position of the patch 2 in FIG. 7B. Therefore, the measured density value of the patch 3 in FIG. 7C is considerably high in the same manner as the patch 2 in FIG. 7B.

In the same manner, the patch 4 in FIG. 7C is arranged at the patch formation position 5, and hence the measured density value of the patch 4 in FIG. 7C is considerably low in the same manner as the patch 5 in FIG. 7B.

In FIG. 7B and FIG. 7C, the patch numbers and the patch formation positions at which the patches are arranged are shown together in order to facilitate understanding.

From the measurement results of the patches 1 to 12 in the first embodiment, it is understood that the density unevenness of a drum cycle is exhibited in a narrow grayscale area. In short, in FIG. 7B, the density unevenness of the drum is exhibited in each of the set of the patches 1 to 6 and the set of the patches 7 to 12 as one cycle, while in FIG. 7C, the density unevenness of the drum is exhibited in each of the set of the patches 1 to 3, the set of the patches 3 to 5, the set of the patches 5 to 7, the set of the patches 7 to 9, and the set of the patches 9 to 11 as one cycle.

With this, when the γ characteristics are obtained by interpolation or approximation based on the densities obtained from the measurement results, it becomes easier to obtain results closer to a state without density unevenness. This is because, when averaging is performed in as wide a grayscale area as the patches 1 to 6 (corresponding to one revolution of the drum) as shown in FIG. 7B, information on the γ characteristics is also averaged to be lost. When the number of patches is increased in order to avoid this, a time period required for the grayscale control increases, and productivity of the image forming apparatus 100 is consequently reduced.

Meanwhile, as shown in FIG. 7C, by performing averaging in a narrow area of the patches 1 to 3 (corresponding to half a revolution of the drum), it is possible to prevent the loss of the information on the γ characteristics while eliminating the influence of the density unevenness. Specifically, in the first embodiment, data between the patch densities is generated by linear interpolation, and grayscale characteristics are smoothed by moving-average calculation, to thereby reduce the influence of the density unevenness. With this, values of respective levels between the grayscale levels of the patch densities are calculated by subjecting the previous and subsequent detection values to the linear interpolation. An average area N for the moving-average calculation is set as an area including information corresponding to one cycle of the drum, to thereby be able to average the density unevenness. Therefore, it is assumed that the average area N includes as many pieces of data as the number of (division area S)+1 patches. Therefore, the grayscale characteristics detected by moving-average processing is smoothed by setting, as an average area, a grayscale level area having a grayscale level number of levels obtained by adding one to the number of divisions of one turn of the photosensitive drum. In this case, a moving-average calculation expression is expressed by Expression 5.

$$y(j)=(1/N+1)*\Sigma_{j-N/2}^{j+N/2}x(j)$$ (Expression 5)

In the first embodiment, the cycle of the density unevenness is divided into two, and hence on the assumption that the average area N includes as many pieces of data as the number of (2+1)=3 patches, 1.5 patches before and after a calculation point are averaged.

In the first embodiment, one cycle of the density unevenness is divided into two to perform the patch dispersed arrangement in one cycle of the density unevenness, but the number S of divisions, the number of cycles, and the length P1 of a patch may be changed depending on the cycle of the density unevenness and the characteristics of the image forming apparatus 100. An exemplary case of performing the patch dispersed arrangement by changing the number S of divisions, the number of cycles, and the number of gradation levels of the patch based on the cycle of the density unevenness and the length P1 of a patch in the first embodiment is shown in Table 2.

TABLE 2

| | Number of divisions | Number of cycles | Number of gradation levels | Patch formation position i | | | | | | | | | | | | | | | | | |
|---|---|---|---|---|---|---|---|---|---|---|---|---|---|---|---|---|---|---|---|---|---|
| | | | | 1 | 2 | 3 | 4 | 5 | 6 | 7 | 8 | 9 | 10 | 11 | 12 | 13 | 14 | 15 | 16 | 17 | 18 |
| Vn(i) | 2 | 1 | 12 | 1 | 3 | 5 | 2 | 4 | 6 | 7 | 9 | 11 | 8 | 10 | 12 | | | | | | |
| | 2 | 2 | 12 | 1 | 3 | 9 | 2 | 6 | 10 | 3 | 7 | 11 | 4 | 8 | 12 | | | | | | |
| | 3 | 1 | 12 | 1 | 4 | 2 | 5 | 3 | 6 | 7 | 10 | 8 | 11 | 9 | 12 | | | | | | |
| | 2 | 3 | 18 | 1 | 7 | 13 | 2 | 8 | 14 | 3 | 9 | 15 | 4 | 10 | 15 | 5 | 11 | 17 | 6 | 12 | 18 |
| | 3 | 3 | 18 | 1 | 10 | 2 | 11 | 3 | 12 | 4 | 13 | 5 | 14 | 6 | 15 | 7 | 16 | 8 | 17 | 9 | 18 |

In this case, the number S of divisions is set equal to or smaller than ½ of the number Ps of patches that can be formed in one cycle of the density unevenness, and is preferred to be as small as possible.

A corrected LUT is generated by performing inverse conversion on a target table of the detected γ characteristics, and is set in the grayscale control unit 310 as the γLUT. In the first embodiment, the target table is set linear, and hence the γLUT is created simply by exchanging input and output of printer γ characteristics.

Flow of Control

Figure 8:
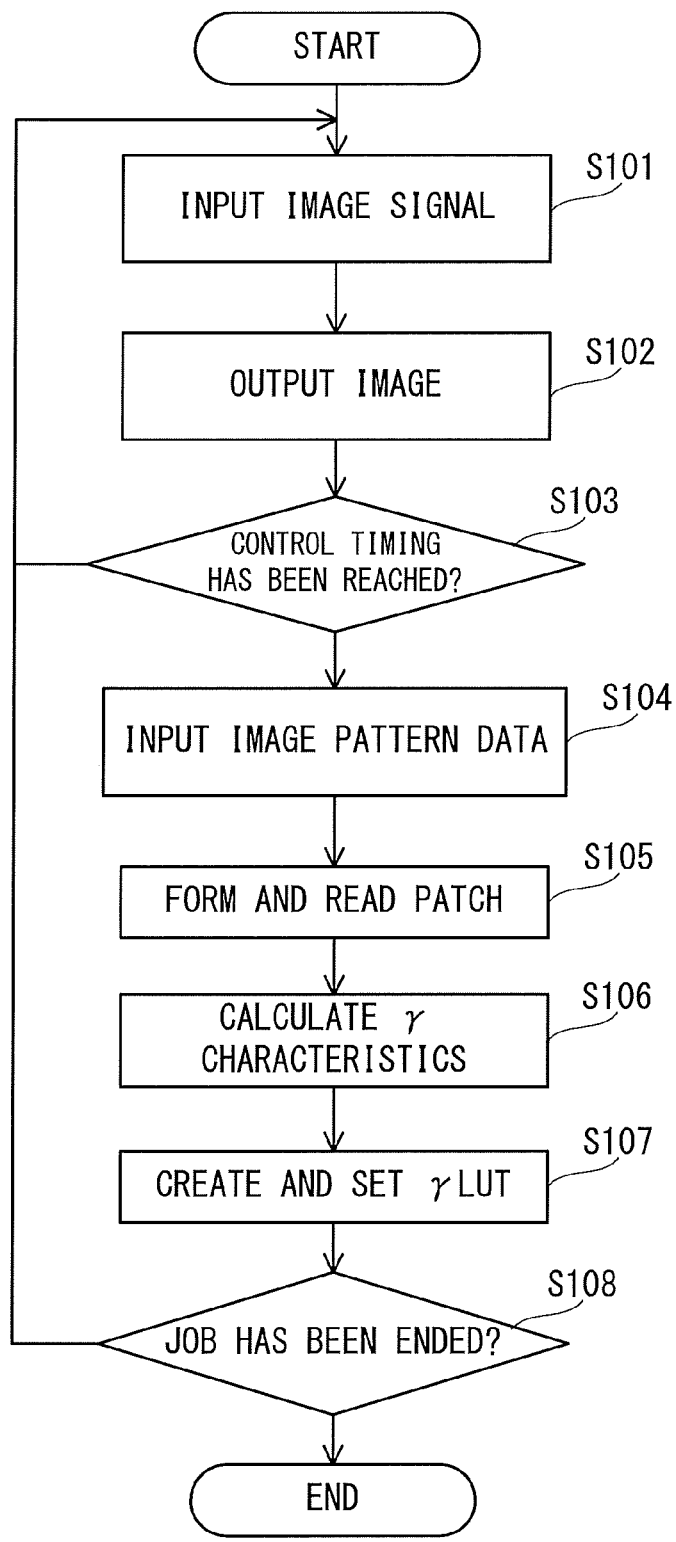
FIG. 8 is a flow chart for illustrating a control operation performed in a first embodiment of the present disclosure.

Next, a control operation performed for the grayscale control in the first embodiment is described with reference to a flow chart in FIG. 8. Each of the processing steps described below is, unless otherwise specified, implemented when the CPU 105 included in the image forming apparatus 100 reads and executes a program stored in, for example, the storage 108 serving as a storage unit. The grayscale control is automatically activated at timing freely set in advance. In the first embodiment, when over 1,000 sheets have been output since the grayscale control was activated last time, the CPU 105 activates the grayscale control.

After the image data is input (Step S101), when image formation based on the image data is ended (Step S102), the CPU 105 determines an activation timing for the grayscale control. When the activation timing has not been reached, the output operation for the next image data is started. When the activation timing for the grayscale control has been reached, the CPU 105 interrupts the image output to start a grayscale control operation (Step S103). In the first embodiment, the grayscale control operation is set to be started when over 1,000 sheets have been output since the last time of the grayscale control. When the grayscale control is activated, the CPU 105 inputs the patch pattern data in a patch arrangement set in advance (Step S104). In the first embodiment, as described above, the CPU 105 uses the patches 1 to 12 as the patch pattern data to perform the patch arrangement based on the patch dispersed arrangement shown in Table 1.

The CPU 105 performs the halftone processing on the patch pattern data, forms the patch pattern on the photosensitive drum through use of a laser, and transfers the patch pattern onto the transfer material 1412. After that, the CPU 105 causes the photosensor 1230 to read the patches on the transfer material 1412 and detect the measurement results (Step S105).

The CPU 105 associates the grayscale levels of the patch pattern, namely, the grayscale levels of the patches 1 to 12, and the arrangement positions of the patches based on the density values obtained from the measurement results detected by the photosensor 1230, and a relationship between the grayscale levels of the patches 1 to 12 and the densities are taken into the memory. As the memory, the storage 108, the RAM 106, or any other such memory may be used. The CPU 105 uses the densities obtained from the measurement results of the patches 1 to 12 to obtain the characteristics of the printer detected by the photosensor when the grayscale control is activated. By arranging the patches 1 to 12 at the formation positions shown in Table 1 and the lower part of FIG. 7C, it is possible to shorten one cycle of the drum as shown in the graph in FIG. 7C.

The measurement results are discrete data based on a pattern of a plurality of gradation levels of the patches 1 to 12. Therefore, the CPU 105 creates the printer γ characteristics as continuous characteristics for all signals by smoothing based on the above-mentioned linear interpolation and moving-average calculation (Step S106).

A method of obtaining the continuous γ characteristics from the discrete data obtained based on the patches 1 to 12 is not particularly limited, and any method can be used.

The CPU 105 creates a LUT in which the input and output of the detected printer γ characteristics are exchanged, and sets the LUT in the γ correction circuit 302 as the γLUT (Step S107). After ending the setting of the γLUT, the CPU 105 restarts the output operation for a normal image. The CPU 105 starts the output operation when there is image data to be processed next, and otherwise ends the output operation (Step S108).

The grayscale control based on the patches 1 to 12 and the patch dispersed arrangement shown in Table 1 was performed for an example in which a difference between the maximum value and the minimum value of the densities in one cycle of the density unevenness is a density difference of 0.02 in the density range around a density of 0.4. As a result, when the patch dispersed arrangement was performed by dividing a rotation cycle of the photosensitive drum into two, a grayscale level range into which information on one cycle falls became 2/5. In addition, the maximum value of a change in color hue exhibited when the grayscale control was repeatedly performed decreased from a color difference ΔE=3 to the color difference ΔE=1.5. This example is involved in a CIE L*a*b* color space, and the color difference ΔE was calculated by the following method.

$$\Delta E = (\Delta L^{*2} + \Delta a^{*2} + \Delta b^{*2})^{0.5} \quad \text{(Expression 6)}$$

As described above, in the first embodiment, the arrangement of the patch pattern used for the grayscale control is optimized by being arranged in a dispersed manner in accordance with the density unevenness, to thereby be able to prevent an increase in number of patches and the loss of information while suppressing the influence of the density unevenness in the rotation direction. As a result, an image forming apparatus capable of forming a patch pattern for grayscale control that can ensure a given number of gradation levels is provided.

Second Embodiment

In the first embodiment, patches are arranged in a sequence formed of all the patch formation positions i.

Meanwhile, in a second embodiment of the present disclosure, no patch is arranged at least at one formation position of the patch formation positions i that form the above-mentioned sequence. In this manner, an area in which no patch is arranged is defined on the image bearing member. Specifically, a position at which no patch is formed in the patch dispersed arrangement area Pbn(i) is set as a patch formation position ia. Then, no patches are formed at patch formation positions that have a common number in the division areas in the same patch dispersed arrangement area Pbn(i), irrespective of the value of the division area. In this case, at the patch formation position at which no patch is formed, Vn(i) is not formed as well. Therefore, the patches are arranged by moving up Vn(i) by the number of numbers of the positions at which no patches have been formed.

Specifically, it is assumed that, in the patch dispersed arrangement area Pbn(i)=1 illustrated in FIG. 6, no patch is arranged at the patch formation position 2(ia) arranged in the division area Bn(i)=1. The value of Bi(i) corresponding to the patch formation position 2 is 2. In this case, in the patch formation position 5 arranged at the division area Bn(i)=2 instead of Bn(i)=1, the value of Bi(i) is 2, which is the same as the value of Bi(i) at the patch formation position 2. Therefore, no patches are arranged at the patch formation positions 2 and 5 both corresponding to Bi(i)=2 in the patch dispersed arrangement area Pbn(i)=1.

The cycle of the density unevenness, the length P1 of a patch, the number S of divisions, the number Pb of cycles, and other such conditions were set to be the same as those in the first embodiment.

In this case, in the first embodiment, as shown in Table 1, the values of Vn(i) at the patch formation positions 1, 2, 3, 4, 5, and 6 are 1, 3, 5, 2, 4, and 6, respectively. However, as described above, in the second embodiment, no patches are arranged at the patch formation positions 2 and 5. At those patch formation positions 2 and 5, corresponding Vn(i)=3 and 4 are not arranged as well. Therefore, in regard to Vn(i)=5 and 6 corresponding to the patch formation positions 3 and 6 at which patches are arranged, the values of Vn(i) are each moved up by the number of two numbers (namely, numbers 3 and 4) of the positions at which no patches have been formed. In short, the values of Vn(i) corresponding to the patch formation positions 3 and 6 become 3 and 4, respectively.

In the same manner, at the patch formation positions 8 and 11, corresponding Vn(i)=9 and 10 are not arranged as well. In regard to Vn(i)=7 and 8 corresponding to the patch formation positions 7 and 10 of the patch formation positions at which patches are arranged, the values of Vn(i) are each moved up by the number of two numbers (namely, 3 and 4) of the positions at which no patches have been formed, to thereby set Vn(i)=5 and 6. Meanwhile, in regard to Vn(i)=11 and 12 corresponding to the patch formation positions 9 and 12, the values of Vn(i) are each moved up by the number of four numbers (namely, 3, 4, 9, and 10) of the positions at which no patches have been formed, to thereby set Vn(i)=7 and 8. In Table 3, the sign "-" represents the patch formation position at which Vn(i) is not formed.

TABLE 3

| i     | 1 | 2 | 3 | 4 | 5 | 6 | 7 | 8 | 9 | 10 | 11 | 12 |
|-------|---|---|---|---|---|---|---|---|---|----|----|----|
| Vn(i) | 1 | — | 3 | 2 | — | 4 | 5 | — | 7 | 6  | —  | 8  |

The second embodiment has been described by taking an example in which the patch arrangement using the expressions for the patch dispersed arrangement is not performed on a part of the patch formation positions. As described above, the influence of the density unevenness can be reduced even when there is such an area in which no patch is arranged.

At the position at which the patch dispersed arrangement is not performed, a patch for another purpose may be formed, or a transfer material being an underlying portion of a patch may be directly detected by the sensor without forming a patch. This increases the degree of freedom of the patch formation position exhibited when the patch dispersed arrangement is performed, to thereby allow optimization in accordance with the characteristics of the image forming apparatus and other control.

As described above, according to one embodiment of the present disclosure, it is possible to provide an image formation technology for substantially shortening the cycle of the density unevenness while suppressing the influence of the density unevenness in the rotation direction, to thereby suppress the loss of characteristic information relating to the density unevenness. Further, by substantially shortening the cycle of the density unevenness, it is possible to prevent the increase in number of patches and the loss of the γ characteristics or other such information relating to the density unevenness, to thereby be able to form a patch pattern for grayscale control that can ensure a given number of gradation levels.

Further, according to one embodiment of the present disclosure, by substantially shortening the cycle of the density unevenness while suppressing the influence of the density unevenness that periodically occurs in the rotation direction, it is possible to suppress the loss of the characteristic information relating to the density unevenness.

The first embodiment and the second embodiment have been described by taking one cycle of the photosensitive drum as an example, but the present disclosure is not limited to the cycle ascribable to the photosensitive drum. For example, the present disclosure can be applied to density unevenness that periodically occurs irrespective of its cause.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-101137, filed May 28, 2018, which is hereby incorporated by reference herein in its entirety.

What is claimed is:

1. An image forming apparatus configured to form an image on a sheet, the image forming apparatus comprising:
   a conversion unit configured to convert image data based on a tone correction condition;
   an image bearing member configured to rotate in a predetermined direction;
   an image forming unit configured to form an image on the image bearing member based on the image data converted by the conversion unit;
   a sensor configured to measure a measurement image formed on the image bearing member; and
   a controller configured to:
      control the image forming unit to form a plurality of measurement images different in density along the predetermined direction of the image bearing member:
      control the sensor to measure the plurality of measurement images on the image bearing member;

perform moving-average processing to determine the tone characteristics from a measurement result of the plurality of measurement images measured by the sensor; and generate the tone correction condition based on the tone characteristics, wherein the controller controls the image forming unit to form the plurality of measurement images in a dispersed manner in terms of positions of the plurality of measurement images on the image bearing member so as to suppress an error which occurs in the tone characteristics due to unevenness which periodically occurs in the plurality of measurement images formed along the predetermined direction.

2. The image forming apparatus according to claim 1, wherein the image bearing member includes a photosensitive member, and wherein a cycle of the unevenness which periodically occurs corresponds to one turn of the photosensitive member.

3. The image forming apparatus according to claim 1, wherein the image bearing member includes an intermediate transfer member, wherein the image is transferred from the intermediate transfer member to the sheet, and wherein a cycle of the unevenness which periodically occurs corresponds to one turn of the intermediate transfer member.

4. The image forming apparatus according to claim 1, wherein the image bearing member includes a photosensitive member, and wherein the controller is configured to:
divide one turn of the photosensitive member into a plurality of areas; and
control the image forming unit to form the plurality of measurement images at corresponding positions on the photosensitive member so as to average unevenness in each of the plurality of areas obtained by the division.

5. The image forming apparatus according to claim 1, wherein the controller is configured to:
divide one turn of the image bearing member into a plurality of areas;
generate a sequence of formation positions at which the plurality of measurement images are to be formed in each of the plurality of areas obtained by the division; and
control the image forming unit to form the plurality of measurement images on the image bearing member so as to inhibit at least one formation position of the formation positions that form the sequence of formation positions from being used as a formation position at which any one of the measurement images is to be arranged.

* * * * *